Oct. 30, 1928.

G. W. BIRD 1,690,049

STEERING GEAR FOR AUTOMOBILES

Filed Oct. 12, 1926

Inventor
George W. Bird

By Watson E. Coleman
Attorney

Oct. 30, 1928.                                                1,690,049
G. W. BIRD
STEERING GEAR FOR AUTOMOBILES
Filed Oct. 12, 1926          4 Sheets-Sheet 2

Inventor
George W. Bird
By Watson E. Coleman
Attorney

Oct. 30, 1928.
G. W. BIRD
1,690,049
STEERING GEAR FOR AUTOMOBILES
Filed Oct. 12, 1926    4 Sheets-Sheet 3
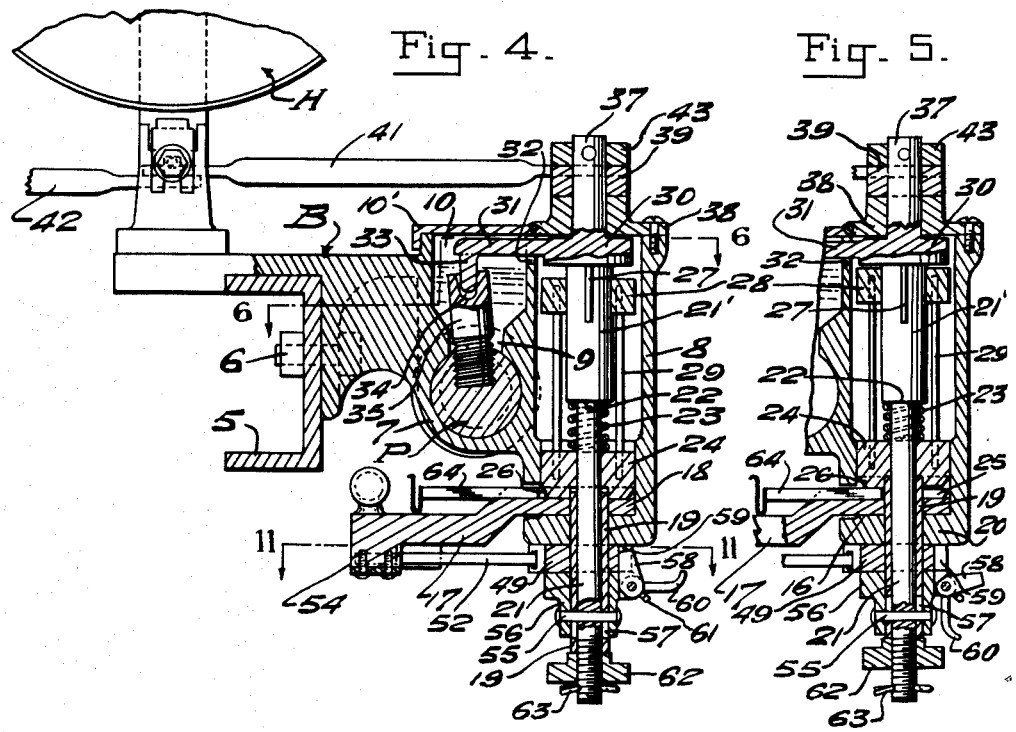
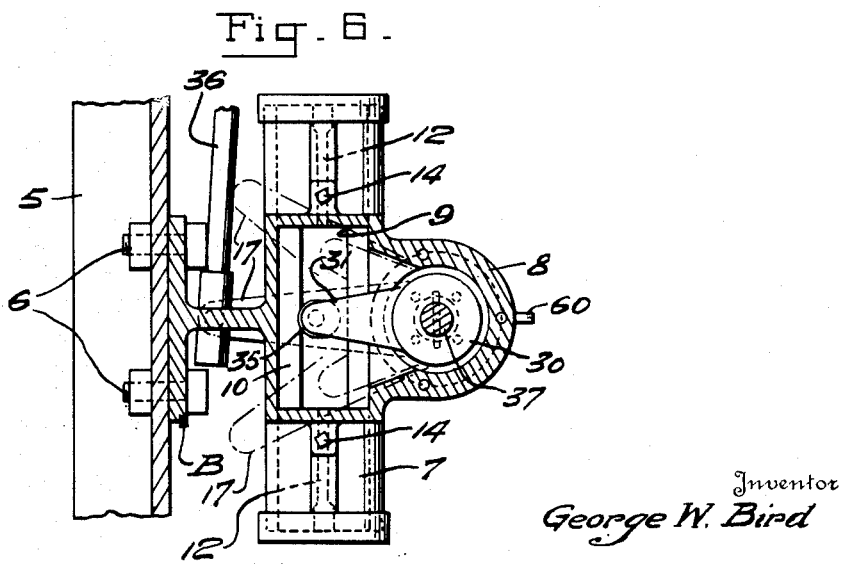
Inventor
George W. Bird
By Watson E. Coleman
Attorney

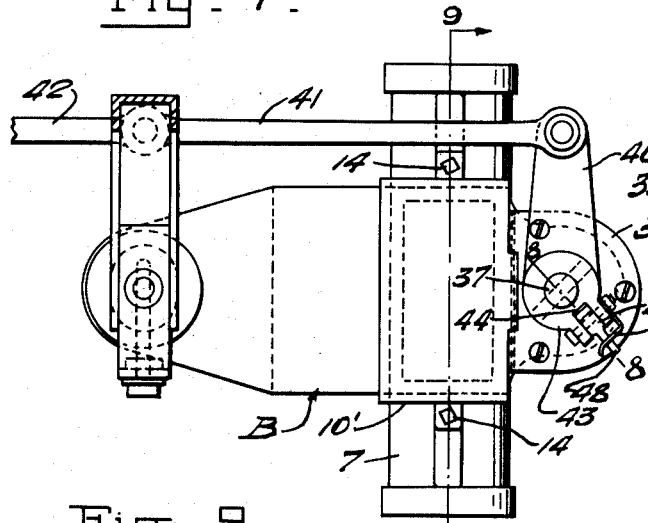
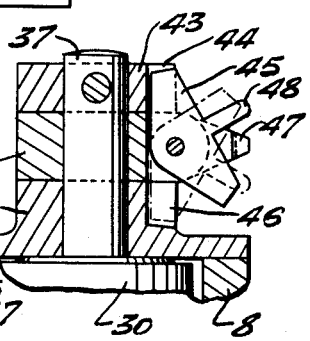
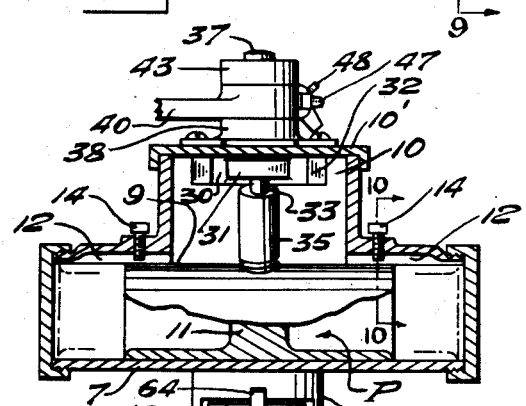
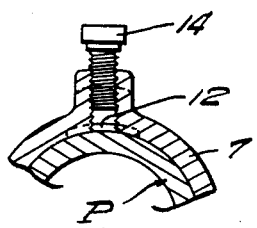
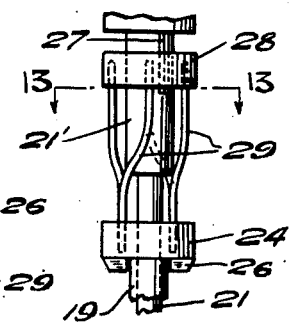
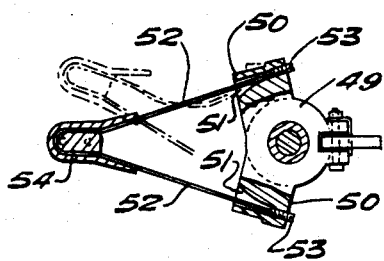
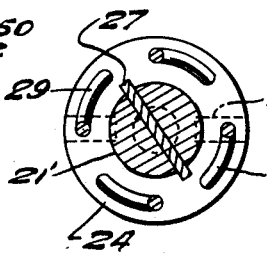

Patented Oct. 30, 1928.

1,690,049

UNITED STATES PATENT OFFICE.

GEORGE W. BIRD, OF GREAT FALLS, MONTANA.

STEERING GEAR FOR AUTOMOBILES.

Application filed October 12, 1926. Serial No. 141,158.

This invention relates to steering gears for motor driven vehicles and it is an object of the invention to provide a gear of this general character having associated therewith a stabilizing mechanism whereby road shocks will be prevented from reaching the hand steering wheel and the parts of the gear associated therewith.

It is also an object of the invention to provide a stabilizing mechanism for use in connection with dirigible headlights operating to hold such headlights against angular, lateral or undue vibration or "shivering."

The invention also has for an object to provide a gear of this kind embodying a stabilizing mechanism constructed in a manner whereby such mechanism may be caused to operate with efficiency in connection with fixed straight ahead headlights or headlights of a dirigible type.

The invention consists in the details of construction and in the combination and arrangement of the several parts of my improved steering gear for motor driven vehicles whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 4 is an enlarged fragmentary view partly in section and partly in elevation illustrating in detail the structure of the stabilizing mechanism as herein employed;

Figure 5 is a view somewhat similar to Figure 4 showing certain of the parts in a second position;

Figure 6 is a sectional view taken substantially on the line 6—6 of Figure 4;

Figure 7 is a view in top plan of the structure as illustrated in Figure 4 with certain of the parts omitted;

Figure 8 is an enlarged fragmentary sectional view taken substantially on the line 8—8 of Figure 7;

Figure 9 is a sectional view taken substantially on the line 9—9 of Figure 7;

Figure 10 is a sectional view taken substantially on the line 10—10 of Figure 9;

Figure 11 is a sectional view taken substantially on the line 11—11 of Figure 4;

Figure 12 is a fragmentary view in elevation of a portion of the stabilizing mechanism as herein disclosed and which operates in the vertically disposed cylinder;

Figure 13 is a sectional view taken substantially on the line 13—13 of Figure 12.

Figure 1:
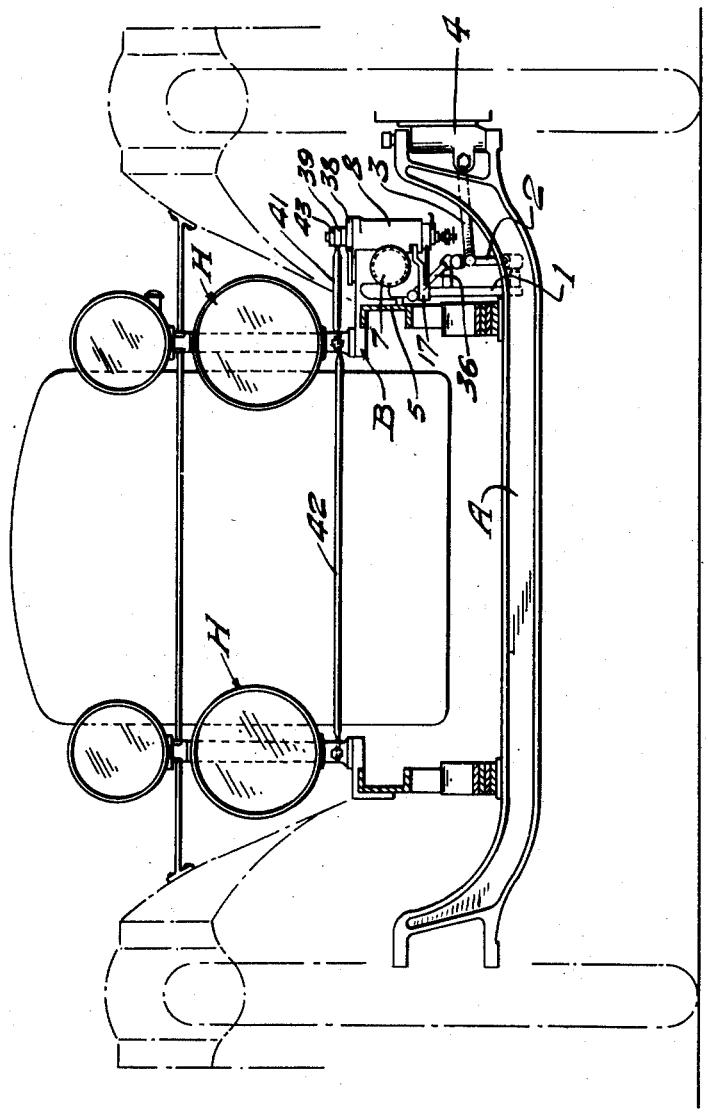
Figure 1 is a view in front elevation and of somewhat a diagrammatic character illustrating a steering gear constructed in accordance with an embodiment of my invention.
Figure 2:
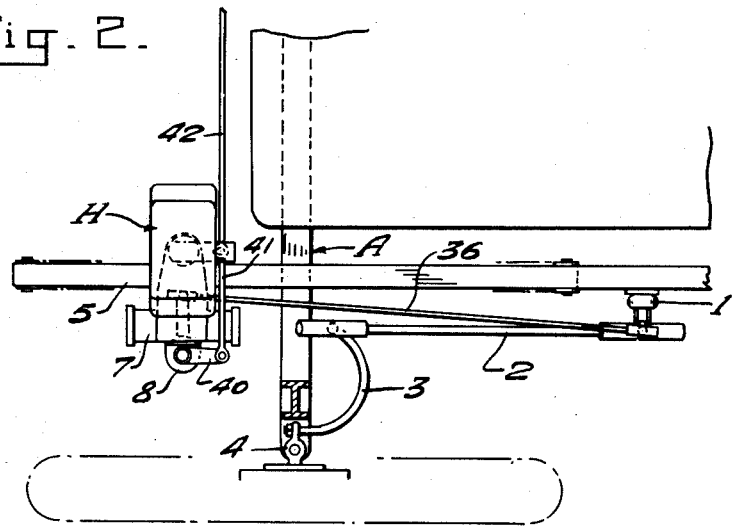
Figure 2 is a fragmentary view in top plan with portions in section illustrating the mechanism as herein embodied.
Figure 3:
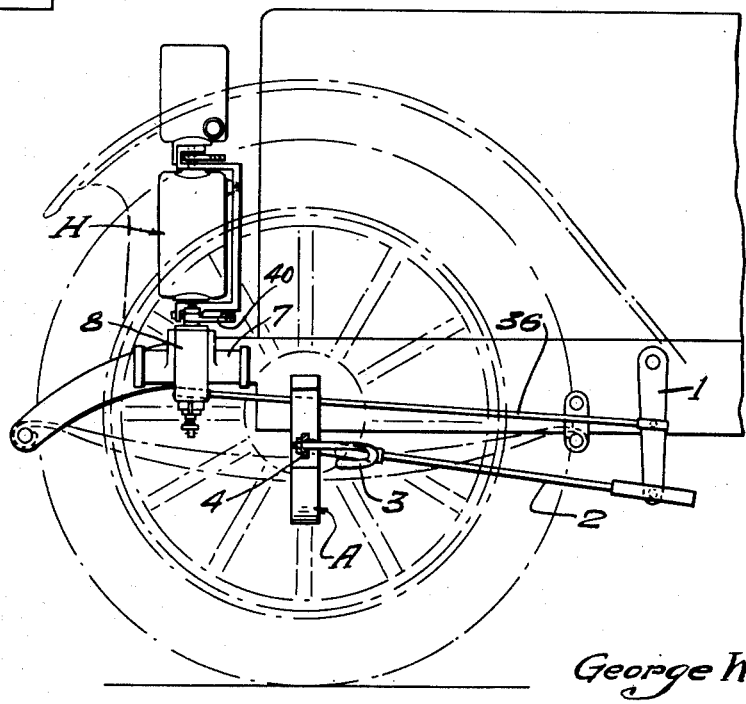
Figure 3 is a view in side elevation of the structure shown in Figure 2, the adjacent vehicle wheel and fender being indicated by broken lines.

As disclosed in the accompanying drawings, 1 denotes a conventional steering arm arranged at side of the vehicle frame or body at the forward part thereof and which is operatively connected through the medium of the drag link 2 with the arm 3 carried by the steering knuckle 4. The foregoing elements are of a well known type and operate in a conventional manner.

Secured to a side member 5 of the frame or chassis of the vehicle in advance of the front axle A is a bracket B of requisite dimensions and preferably constituting a casting. This bracket B is secured to the member 5 in any preferred manner, as indicated at 6, and is disposed outwardly in a lateral direction from the member 5. The outer portion of the bracket B is provided with a horizontally disposed cylinder 7 and a vertically disposed cylinder 8 arranged at substantially the longitudinal center of the cylinder 7.

The central portion of the wall of the cylinder 7 in the upper part thereof is provided with an elongated opening or slot 9 affording communication between the bore of the cylinder 7 and a chamber 10 provided in the bracket B above the cylinder 7 and of desired capacity.

Working in the cylinder 7 is an elongated tubular piston P having its central part intersected by a partition or septum 11, said piston P being of a length in excess of the length of the elongated opening 9 hereinbefore referred to. The upper wall of the cylinder 7 is provided at its opposite end portions with longitudinally disposed grooves 12 affording communication between the extremities of the cylinder 7 and the opposite ends of the opening 9, the flow through said grooves 12 being under control of the adjustable bolts or members 14 threaded through the wall of the cylinder 7.

The cylinder 7 at opposite sides of the partition or septum 11 of the piston P is adapted to be filled with a suitable liquid, preferably light oil, and which liquid also partially fills the chamber 10. This liquid serves to normally maintain the piston P against movement upon sudden or abrupt shock or strain being imposed upon the liquid as will hereinafter be more particularly described, yet at the same time permitting the requisite movement of the piston P when the turning pull is being imposed upon the hand steering wheel. This action of the fluid is regulated or controlled by the freedom or extent to which the fluid may readily pass through the grooves or channels 12.

The vertical cylinder 8, as herein disclosed, is integrally formed with the cylinder 7 and provides a dust-proof container for certain of the parts of the stabilizing mechanism. The lower portion of the cylinder 8 is provided in its wall with a horizontal slot 16 of requisite length through which extends an actuating arm 17. The portion of the arm 17 within the cylinder 8 is expanded or enlarged to provide a disc 18 readily rotating within said cylinder 8 to the extent afforded by the slot 16. This disc 18 has disposed through the axial center thereof a sleeve 19 which also extends exteriorly of the cylinder 8 through the lower end 20 thereof. This sleeve 19 surrounds a portion of a shaft 21. This shaft 21 is of a length to terminate below the outer end of the sleeve 19.

The shaft 21 within the cylinder 8 is enlarged, as at 21', to provide a shoulder 22 against which bears an end portion of a spiral spring 23 encircling the shaft 21 and interposed between said shoulder 22 and a disc 24 within the lower portion of the cylinder 8 and freely mounted on the shaft 21 and the inserted end portion of the sleeve 19.

The upper face of the disc 18 is provided with a radial groove 25 adapted to receive a key 26 carried by the under surface of the disc 24 whereby the discs 24 and 18 may be clutched together for unitary rotation, such locking being effectively maintained under the tension of the spring 23.

The upper portion of the enlarged part 21' of the shaft 21 is provided with an outstanding key 27 extending lengthwise thereof and which serves to lock to the part 21' the disc 28 enabling said disc 28 to rotate with the shaft 21 but to have movement lengthwise thereof when required.

The discs 24 and 28 are connected by a series of equi-distantly spaced spring or resilient rods 29 for a purpose to be hereinafter more particularly referred to.

The shaft 21 immediately above the portion 21' is further enlarged to provide a head 30 from which radiates a rocker arm 31 extending within the upper portion of the chamber 10 through a suitably positioned slot 32 provided in a wall of the cylinder 8. The outer extremity of the arm 31 carries a depending pin or finger 33. This pin or finger 33 is received within a pocket or recess 34 provided in the outer end of an upstanding member or arm 35 rigidly secured to the central portion of the piston P as is afforded by the partition or septum 11 hereinbefore referred to.

Upon turning movement of the shaft 21 by action of the arm 17, the piston P will move horizontally with slight rocking motion as impelled by the rocker arm 31.

Applying force to the piston P through the chamber 10 obviates the use of stuffing boxes with their attendant troubles, loss of liquid by leakage and the consequent formation of air pockets in the cylinder. This latter is avoided by the fact that air in each end portion of the cylinder 7 will readily escape around the ends of the piston P through the channels 12 hereinbefore referred to. A particular advantage of this resides in the fact that by permitting the escape of air and thus preventing the formation of air pockets within the cylinder 7, consequent jerky action of the piston is eliminated.

The rods 29, herein shown as four in number, act as shock absorbers caused by resistance offered to the front steering wheels by contact with loosely surfaced, rough or rutted roads or other obstacles encountered. When functioning as a shock absorber, the rods 29 will readily twist, as indicated in Figure 12, upon relative rotation between the discs 24 and 28, the disc 28 moving downwardly and lengthwise of the portion 21' of the shaft 21 during such action.

The functioning of the stabilizing mechanism is, as is believed to be clearly understood, dependent upon the actuating arm 17 which is operatively connected through the medium of the rod or link 36 or in other substantial manner with the steering arm 1.

The shaft 21 above the head or enlargement 30 is provided with an upwardly directed stub shaft 37 disposed through the upper head 38 for the cylinder 8. Freely mounted on this stub shaft 37 is a disc 39 from which radiates a rocker arm 40 operatively connected by a rod or link 41 with the standard of a headlight H.

In practice, both of the headlights are tied or connected for unitary movement in the same general direction by a connecting rod 42. The particular construction and mounting of the headlights H form no particular part of the present invention and therefore a detailed description and illustration thereof is deemed unnecessary.

Keyed to the shaft 37 above the disc 39 is a disc or head 43 provided in its periphery with a recess 44 which is adapted to receive an extremity of a latch 45 pivotally carried by the disc 39 whereby the disc 39 may be locked through the medium of the head or disc 43 for turning movement with the shaft 21 when it is desired to have the headlights H operate as dirigible. When the latch 45 however, is swung into a position to cause the same to engage within the notch or recess 46 provided in the head 38, the headlights H will be positively locked or fixed in straight ahead adjustment. The latch 45 is held in either of its two positions through the medium of the spring 47 coacting with an outstanding arm 48 carried by the central portion of the latch 45.

Freely mounted on the sleeve 19 adjacent to the lower head 20 of the cylinder 8 is a disc 49. This disc 49 is provided with oppositely disposed outstanding arms 50 provided in their outer extremities with the openings 51 into which are directed the extremities of a substantially V-shaped spring member 52, the extent of engagement of the extremities of the spring member 52 within the openings 51 being determined by the adjustable screws 53 threaded within the rear portions of the openings 51. The inner walls of the openings 51 are also preferably rounded to assure efficient coaction of the spring 52 with the arms 50. The apex or central portion of the spring 52 is operatively engaged, as indicated at 54, with the outer end portion of the actuating arm 17, said spring 52 providing additional means for maintaining the arms 50 of the disc 49 in normal position relative to any position assumed by the outer end portion of the actuating arm 17 as determined by the direction of the steering wheels. The arms 50 being thus normal, the piston P will resist any shock movement no matter what direction the moving front wheels may point, on curves as well as straight ahead. The spring 52 supplements the action of the rods 29. The spring 52 initially yields more power to overcome the hydrostatic pressure or resistance of piston P and becoming less powerful as the compressed side becomes more bent. In the meantime the rods 29 exert more and more power to overcome said resistance as these rods 29 are bent by rotation of the disc 24. In their reactions, causing the rotation of the shaft 21 by overcoming the resistance of the piston P, the rods 29 become less powerful as they unbend, while the spring 52 becomes more and more powerful as it approaches the straight, the final action of the spring 52 assuring the arms 50, and consequently the disc 49 and shaft 21, assuming their normal positions. This assures the headlight or headlights at all times accurately projecting their rays directly in line with the progressive motion of the front wheels of the vehicle.

Keyed to the lower extended portion of the shaft 21 by the pin 55 or the like is a collar 56, said collar being disposed around the outer portion of the sleeve 19, said sleeve 19 being provided, however, with the diametrically and longitudinally directed slots 57 through which the pin 55 is directed so that the sleeve 19 may have desired endwise movement upon the shaft 21 for a purpose to be hereinafter referred to.

The collar 56 carries a latch 58 adapted to be received within a peripheral notch 59 in the disc 49 to lock such disc for rotation with the shaft 21 when said shaft 21 is to be operated by spring 52. The latch 58 is operated in a conventional manner by a tail-piece 60 and associated with this tail-piece 60 and latch 58 is a spring 61 for holding the latch 58 in either of its two positions.

In daylight service when not desirous of using the stabilizing mechanism or headlights, by disengaging the discs 18 and 24 and releasing the latch 58 from the disc 49, the rocker or actuating arm 17 and the disc 49 will be idle producing no motion of shaft 21.

Threaded upon the shaft 21 for contact with the outer or lower end of the sleeve 19 is a milled nut 62 held against removal from the shaft 21 by a cotter pin 63 or the like.

When it is desired to separate the discs 18 and 24, requisite turning movement of the nut 62 will force the sleeve 19 upwardly with a resultant upward movement of the disc 24 against the spring 23 to break the clutching engagement between the discs 18 and 24. A key 64, when the clutching engagement is broken between the discs 18 and 24, slides in the groove 25 in the upper face of the disc 18 and passes through the shaft 21 and sleeve 19, thereby positively locking the actuating arm 17 and the shaft 21 and thus bringing all movement of arm 17, from shocks or steering motion, directly against the resistance of piston P without the interposition of either of the spring absorbers.

In practice, road shocks are effectively absorbed by the rods 29 and spring 52 quickly bending under shock and unbending with a quick reaction and during which time the piston P will be quiescent. In steering, the torsional movement of the discs 24 and 49 being sustained is communicated from the rods 29 and spring 52 to the shaft 21, the piston P readily moving under said pressure by rocker arm 31.

Legitimate steering movement by causing continuous sustained pressure upon piston P will force the liquid, which is preferably antifreezing and non-compressible, to and from the opposite ends of the cylinder 7, relieving pressure and allowing desired rotative movement of the shaft 21 and consequent radial or swinging motion of steering arm 1, the adjustment of the screws or members 14 governing the quickness of flow of the liquid or fluid. The liquid or fluid filling of the cylinder 7 will resist any rapid or violent movement of the piston P when the steering gear is subjected to abnormal shock, thus assuring the steering arm 1 and the associated parts of the steering gear proper, such as the worm gear and hand wheel post or standard, remaining quiescent.

The chamber 10 has its upper face normally open but is closed by a lid 10' hingedly connected to the head 38 of the cylinder 8.

From the foregoing description it is thought to be obivous that a steering gear for motor driven vehicles constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A stabilizing mechanism comprising a cylinder, a shaft extending therein and rotatably supported thereby, a disc within the cylinder and having an actuating arm extending outwardly of the cylinder, a second disc on the shaft, coacting clutch means for normally maintaining said means in clutching action, a shock absorbing medium coacting with the shaft and the second disc and means for separating the discs.

2. A stabilizing mechanism comprising a cylinder, a shaft extending therein and rotatably supported thereby, a disc within the cylinder and having an actuating arm extending outwardly of the cylinder, a second disc on the shaft, coacting clutch means for normally maintaining said means in clutching action, a shock absorbing medium coacting with the shaft and the second disc and means for separating the discs, a hydraulic means coacting with the shaft for holding the same against turning movement upon abrupt shock.

3. A stabilizing mechanism comprising a cylinder, a shaft extending therein and rotatably supported thereby a disc within the cylinder and having an actuating arm extending outwardly of the cylinder, a second disc on the shaft, coacting clutch means for normally maintaining said means in clutching action, a shock absorbing medium coacting with the shaft and the second disc, means for separating the discs, and spring means coacting with the actuating arm of the disc for normally holding the same in a predetermined position.

4. A stabilizing mechanism comprising a cylinder a shaft extending therein and rotatably supported thereby, a disc within the cylinder and having an actuating arm extending outwardly of the cylinder, a second disc on the shaft, coacting clutch means for normally maintaining said means in clutching action, a shock absorbing medium coacting with the shaft and the second disc, means for separating the discs, and spring means coacting with the actuating arm of the disc for normally holding the same in a predetermined position, and means for locking said spring means inoperative.

5. A stabilizing mechanism of the class described comprising a shaft supported for rotation, hydraulic means coacting with said shaft for holding the same against rotation upon undue shock, an element freely mounted on said shaft, and means carried by said element for locking it to the shaft for rotation therewith.

In testimony whereof I hereunto affix my signature.

GEORGE W. BIRD.